United States Patent [19]

Osuka et al.

[11] Patent Number: 5,227,343
[45] Date of Patent: Jul. 13, 1993

[54] NEAR INFRARED SCREENING FILTER GLASS

[75] Inventors: Takuo Osuka, Tokyo; Takahiro Nakayama; Osamu Sakamoto, both of Funabashi, all of Japan

[73] Assignee: Asahi Glass Company Ltd., Tokyo, Japan

[21] Appl. No.: 843,014

[22] Filed: Feb. 28, 1992

[30] Foreign Application Priority Data

Feb. 28, 1991 [JP] Japan ................................. 3-055724

[51] Int. Cl.$^5$ ............................................. C03C 3/064
[52] U.S. Cl. ........................................ 501/77; 501/104
[58] Field of Search ..................... 501/77, 904, 47, 48

[56] References Cited

U.S. PATENT DOCUMENTS 4,303,298 12/1981 Yamashita ........................... 501/904
5,032,315 7/1991 Hayden et al. ....................... 501/47

Primary Examiner—Mark L. Bell
Assistant Examiner—Deborah Jones
Attorney, Agent, or Firm—Oblon, Spivak, McClelland, Maier & Neustadt

[57] ABSTRACT

A near infrared screening filter glass consisting essentially of from 35 to 60 wt. % of $P_2O_5$, from 10 to 30 wt. % of $Al_2O_3$, from 1.5 to 15 wt. % of $SiO_2$, from 3 to 15 wt. % of $B_2O_3$ and from 0.1 to 10 wt. % of CuO.

3 Claims, 1 Drawing Sheet

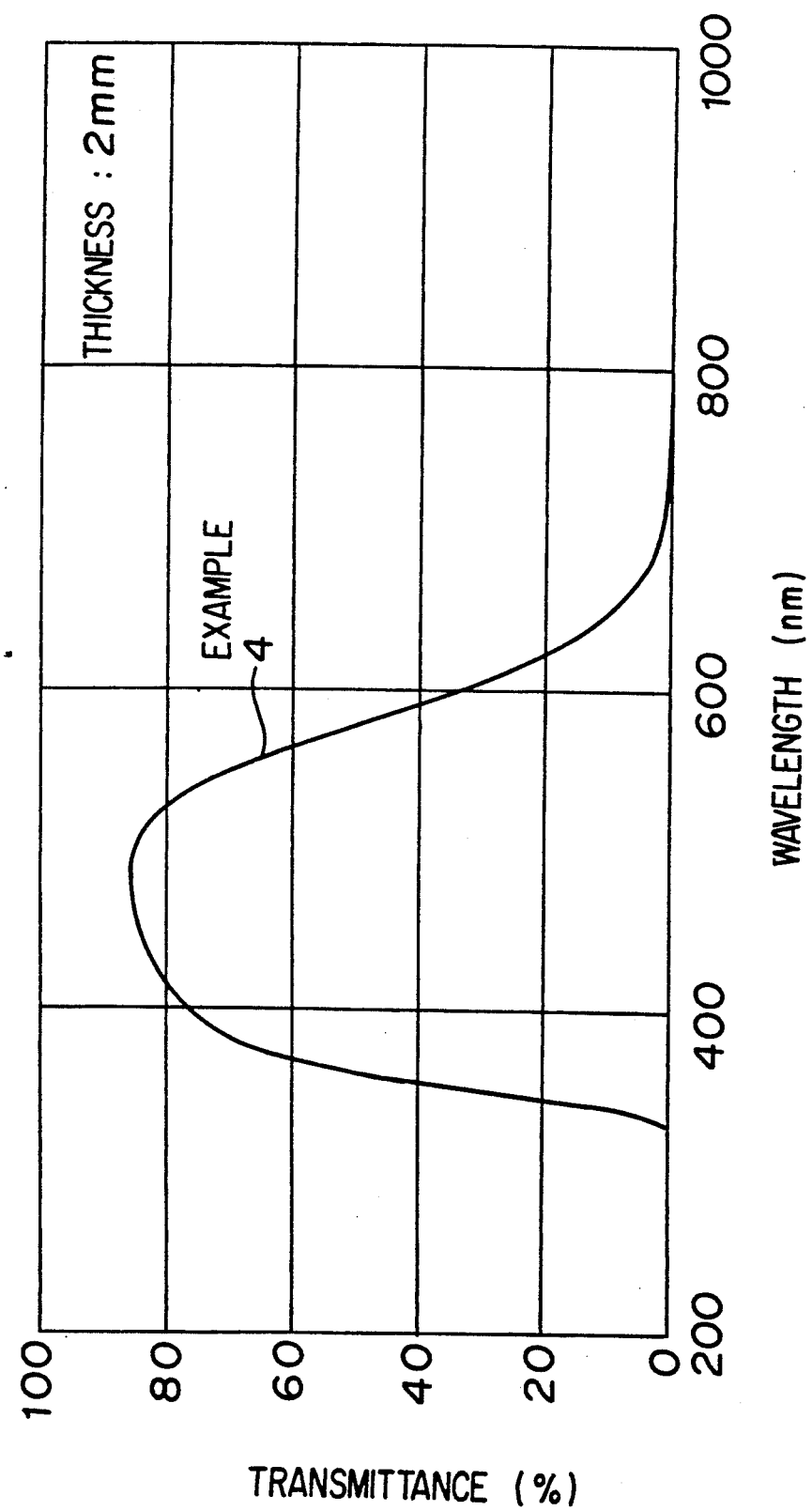

NEAR INFRARED SCREENING FILTER GLASS

BACKGROUND OF THE INVENTION

1. Field of the Invention

The present invention relates to a near infrared screening filter glass which is useful, for example, as a color-correcting filter glass for a color VTR camera. More particularly, it relates to a near infrared screening filter glass which is capable of efficiently transmitting visible rays of from 400 to 520 nm and has excellent properties for absorbing light rays of about 700 nm and which has good weathering properties.

2. Discussion of Background

The spectral sensitivity of a picture-taking device used in a color VTR camera usually extends to cover from the visible region to the near infrared region (1000 nm). It is, therefore, necessary to screen light rays in this near infrared region by means of a filter to bring the sensitivity close to the visual sensitivity of human being. For this purpose, filter glass having CuO incorporated to a phosphate glass, is used for a filter of this type so that near infrared rays are selectively absorbed. Specifically such a filter glass is required to have a high transmittance of visible rays of from 400 to 520 nm and to be able to absorb light rays of from 550 to 950 nm as much as possible.

However, conventional near infrared screening filter glass is a glass containing a substantial amount of $P_2O_5$ and thus has poor weathering properties. It thus had a problem that, for example, the surface underwent a modification when left at 65° C. in an atmosphere having a relative humidity of 90% for about 250 hours, and as the time further passed, the spectral properties tended to deteriorate. Whereas, a fluorophosphate glass containing CuO has been proposed as a near infrared screening filter glass which satisfies both of the spectral properties and the weathering properties (Japanese Unexamined Patent Publication No. 219037/1989). This glass does not undergo any surface modification or deterioration of the spectral properties when maintained at 65° C. under a relative humidity of 90% for about 1000 hours. However, this glass has a drawback that when subjected to a powder water-durability test in accordance with JOGIS (Japan Optical Glass Industrial Standard)-1975, it shows a substantial weight change after the test (weight reduction: at least 0.04 wt. %) and thus has poor water-durability. This means that when moisture condensation takes place on the glass surface, the glass surface is likely to undergo a modification.

SUMMARY OF THE INVENTION

The present invention has been made to solve such a problem and provides a near infrared screening filter glass consisting essentially of from 35 to 60 wt. % of $P_2O_5$, from 10 to 30 wt. % of $Al_2O_3$, from 1.5 to 15 wt. % of $SiO_2$, from 3 to 15 wt. % of $B_2O_3$ and from 0.1 to 10 wt. % of CuO, which is excellent in both the weathering properties and the water-durability.

BRIEF DESCRIPTION OF THE DRAWING

FIG. 1 is a graph showing the spectral properties of a near infrared screening filter glass according to the present invention.

DETAILED DESCRIPTION OF THE PREFERRED EMBODIMENTS

In the present invention, $P_2O_5$ is a component constituting a part of the backbone structure of the glass, and its content is within a range of from 35 to 60 wt. %. If $P_2O_5$ is less than 35 wt. %, vitrification tends to be difficult, and if it exceeds 60 wt. %, the weathering properties tend to be low, such being undesirable. It is particularly preferred to adjust the content to a level of from 40 to 50 wt. %, whereby vitrification can constantly be carried out and adequate weathering properties can be attained.

$Al_2O_3$ is a component which is required to reinforce the glass structure and to provide adequate weathering properties and water-durability. Its content is from 10 to 30 wt. %. If $Al_2O_3$ is less than 10 wt. %, no adequate weathering properties and water-durability tend to be obtained, and if it exceeds 30 wt. %, devitrification is likely to take place. It is particularly preferred to bring the content to a level of from 15 to 25 wt. %, whereby adequate weathering properties and water-durability can be obtained, and vitrification can constantly be attained. Further, it is preferred that the weight ratio of $Al_2O_3/P_2O_5$ is adjusted to a level within a range of from 0.3 to 0.55. If this ratio is less than 0.3, the weathering properties of the glass tend to be poor. On the other hand, if this ratio exceeds 0.55, the stability of the glass tends to be low.

$SiO_2$ is a component which constitutes a part of the backbone structure of the glass and which is required to provide adequate weathering properties and water-durability. Its content is from 1.5 to 15 wt. %. If $SiO_2$ is less than 1.5 wt. %, no adequate weathering properties and water-durability tend to be obtained, and if it exceeds 15 wt. %, devitrification is likely to take place, such being undesirable. It is particularly preferred to adjust the content to a level of from 2.5 to 10 wt. %, whereby adequate weathering properties and water-durability will be obtained, and vitrification can constantly be attained.

$B_2O_3$ is a component which serves to reinforce the glass structure and to facilitate vitrification. Its content is from 3 to 15 wt. %. If $B_2O_3$ is less than 3 wt. %, vitrification tends to be difficult, and if it exceeds 15 wt. %, the water-durability tends to be low.

CuO is a component which absorbs light rays in the near infrared region. If it is less than 0.1 wt. %, no adequate absorption for screening the near infrared rays can be attained, and if it exceeds 10 wt. %, CuO will be reduced, whereby glass tends to be unstable.

To the above components, additional components such as MgO, CaO, SrO, BaO, ZnO, $Li_2O$, $Na_2O$, $K_2O$, $As_2O_3$, $Sb_2O_3$ and $SnO_2$ may be incorporated in a total amount of up to 30 wt. %. By incorporating MgO, CaO, SrO, BaO and ZnO among them in a total amount within a range of from 0 to 20 wt. %, it is possible to lower the melting temperature and to facilitate vitrification. However, if the total amount exceeds 20 wt. %, the weathering properties tend to deteriorate. Further, by incorporating $Li_2O$, $Na_2O$ and $K_2O$ in a total amount within a range of from 0 to 10 wt. %, it is also possible to lower the melting temperature and facilitate vitrification. However, if the total amount exceeds 10 wt. %, the weathering properties tend to deteriorate. When incorporated in a total amount within a range of from 0 to 5 wt. %, $As_2O_3$, $Sb_2O_3$ and $SnO_2$ serve to render CuO hardly reducible and to prevent the spectral properties from departing from the desired properties. Even if they are incorporated beyond 5 wt. %, no further improvement in their effects will be obtained.

Such a glass can be prepared, for example, as follows:

Starting materials are blended to obtain a mixture having a desired composition, which is then melted and vitrified in a usual atmosphere. The temperature for melting is at a level of from 1200 to 1500° C. During the melting operation, it is preferred to conduct stirring to homogenize the glass. Then, the glass is poured into a mold and gradually cooled for solidification. The solidified glass is cut and polished to obtain a filter glass of the present invention. As the starting material for $P_2O_5$ to be used here, an aqueous orthophosphoric acid solution, or a double salt of aluminum phosphate and barium phosphate, may be mentioned. As the starting material for $Al_2O_3$, aluminum oxide, aluminum hydroxide or aluminum phosphate, may be mentioned. As the starting material for $SiO_2$, silica sand may be mentioned, and as the starting material for $B_2O_3$, boric acid or boric anhydride may be mentioned. As starting materials for $Li_2O$, $Na_2O$, $K_2O$, MgO, CaO, SrO and BaO, carbonates, sulfates or nitrates of the respective metals may be mentioned, and as the starting material for CuO, cupric oxide may be mentioned.

Now, the present invention will be described in further detail with reference to examples. However, it should be understood that the present invention is by no means restricted to such specific examples.

The blend compositions and the weathering properties of Examples 1 to 10 are shown in Table 1. Table 2 shows similar data of comparative examples. FIG. 1 shows the spectral properties of a near infrared screening filter glass of the present invention.

EXAMPLES 1 to 3

Glass materials were blended to obtain a mixture having the composition (unit: wt. %) as shown in Table 1, and the mixture was put into a platinum crucible and then introduced into an electric furnace. Then, the mixture was melted and vitrified in a normal atmosphere at a temperature of from 1450 to 1500° C. under stirring, and the melted glass was defoamed and homogenized. Then, the melted glass was poured into a preheated mold and gradually annealed at about 500° C. to obtain a solidified glass. Then, this glass was cut and polished to obtain a sample having a size of 10 mm × 10 mm and a thickness of 2 mm. This sample was maintained at 65° C. under a relative humidity of 90% for about 1000 hours, and then the surface change was visually inspected, whereby no change of the surface was observed. The change of the surface was inspected under a halogen lamp high luminance light source of 100 W and evaluated on the basis of whether or not there was any modification of the surface.

Further, with respect to this sample, the weathering properties and the water-durability were measured, and the results of the weathering properties are shown also in Table 1. For evaluation of the weathering properties, the sample was maintained at 65° C. under a relative humidity of 90%, whereby the weathering properties were represented by the time until the transmittance at wavelength of 400 nm dropped by at least 3%.

The water-durability was determined by the "Measuring Method for Chemical Durability of Optical Glass (Powder Method)" according to JOGIS 1975. The result in each Example was less than 0.01%.

EXAMPLES 4 to 10

In the same manner as in Examples 1 to 3, melting was conducted at a temperature of from 1200° to 1300° C., and gradual annealing was conducted at a temperature of about 450° C. to obtain a glass. In the same manner as in Examples 1 to 3, a sample was prepared, and in the same manner as in Examples 1 to 3, this sample was maintained at 65° C under a relative humidity of 90% for about 1000 hours, and the surface change was inspected. As a result, no change of the surface was observed. Further, with respect to such a sample, the weathering properties and the water-durability were measured in the same manner as in Examples 1 to 3. The weathering properties (unit: hour) are shown also in Table 1. The water-durability was less than 0.01% in each Example. Further, a graph of the spectral transmittance measured with respect to the glass of Example 4, was shown in FIG. 1.

TABLE 1

| Example | 1 | 2 | 3 | 4 | 5 | 6 | 7 | 8 | 9 | 10 |
|---|---|---|---|---|---|---|---|---|---|---|
| $P_2O_5$ | 58.0 | 56.8 | 53.9 | 41.6 | 44.9 | 43.3 | 40.4 | 49.5 | 40.5 | 45.4 |
| $Al_2O_3$ | 23.2 | 27.7 | 20.6 | 19.1 | 16.1 | 17.4 | 20.2 | 16.7 | 17.8 | 13.6 |
| $SiO_2$ | 8.7 | 4.8 | 10.4 | 3.2 | 3.2 | 6.8 | 7.0 | 10.3 | 10.4 | 13.9 |
| $B_2O_3$ | 8.6 | 9.5 | 13.1 | 6.2 | 6.1 | 6.8 | 4.3 | 5.4 | 3.3 | 3.5 |
| MgO | | | | | | | | 4.0 | | |
| CaO | | | | | | 4.2 | 3.2 | | 2.7 | 2.8 |
| SrO | | | | | | | | | 7.5 | |
| BaO | | | | 13.6 | 13.5 | 6.8 | 6.4 | | | |
| ZnO | | | | | | | | | | 7.8 |
| $Li_2O$ | | | | 1.4 | 1.3 | | | 3.4 | | 6.3 |
| $Na_2O$ | | | | 5.4 | 5.3 | 6.3 | 7.1 | 3.3 | 7.5 | 4.7 |
| $K_2O$ | | | | 8.4 | 8.3 | 6.7 | 8.1 | 4.9 | 6.2 | |
| $As_2O_3$ | | | | | | | 1.0 | | | |
| $Sb_2O_5$ | | | | | | | | 1.4 | | |
| $SnO_2$ | | | | | | | | | 2.4 | |
| CuO | 1.5 | 1.2 | 2.0 | 1.1 | 1.3 | 1.7 | 2.3 | 1.1 | 1.7 | 2.0 |
| $Al_2O_3/P_2O_3$ | 0.4 | 0.49 | 0.38 | 0.46 | 0.36 | 0.4 | 0.5 | 0.34 | 0.44 | 0.3 |
| Weathering properties | 900 | 900 | 950 | 1000 | 1050 | 1050 | 1000 | 1000 | 1000 | 1000 |

With respect to glasses having compositions (unit: wt. %) of Comparative Examples 1 and 2 as shown in Table 2, the weathering properties (unit: hour) and the water-durability (unit: %) were measured, and the results are shown also in Table 2.

As is evident from these results, the near infrared screening filter glass of the present invention is excellent in the weathering properties and the water-durability. Further, this glass has a high transmittance of light rays of from 400 to 520 nm and very well absorbs light rays of from 550 to 950 nm.

TABLE 2

|  | Comparative Example 1 |  | Comparative Example 2 |
| --- | --- | --- | --- |
| $P_2O_5$ | 77.0 | $P_2O_5$ | 27.4 |
| $Al_2O_3$ | 12.0 | $AlF_3$ | 8.1 |
| MgO | 4.0 | $MgF_2$ | 5.2 |
| BaO | 4.0 | $CaF_2$ | 10.3 |
| $Li_2O$ | 1.0 | $SrF_2$ | 19.1 |
|  |  | $BaF_2$ | 14.8 |
|  |  | $Al_2O_3$ | 7.8 |
|  |  | $Li_2O$ | 5.9 |
| CuO | 2.0 | CuO | 1.4 |
| Weathering properties | 250 | Weathering properties | 1000 |
| Water-durability | 0.03 | Water-durability | 0.04 |

The near infrared screening filter glass of the present invention has excellent weathering properties and spectral properties which have not been observed with a near infrared screening filter glass made of a conventional phosphate glass and also has water-durability superior to a fluorophosphate glass.

What is claimed is:

1. A near infrared screening filter glass consisting essentially of from 35 to 60 wt. % of $P_2O_5$, from 10 to 30 wt. % of $Al_2O_3$, from 1.5 to 15 wt. % of $SiO_2$, from 3 to 15 wt. % of $B_2O_3$ and from 0.1 to 10 wt. % of CuO.

2. The near infrared screening filter glass according to claim 1, which consists essentially of from 40 to 50 wt. % of $P_2O_5$, from 15 to 25 wt. % of $Al_2O_3$, from 2.5 to 10 wt. % of $SiO_2$, from 3 to 15 wt. % of $B_2O_3$ and from 0.1 to 10 wt. % of CuO.

3. The near infrared screening filter glass according to claim 2, wherein the weight ratio of $Al_2O_3/P_2O_5$ is within a range of from 0.3 to 0.55.

* * * * *